United States Patent
Hein

(12) 
(10) Patent No.: US 6,499,429 B1
(45) Date of Patent: Dec. 31, 2002

(54) BIRD BELL FEEDER

(76) Inventor: Troy Hein, 7608 SW. 48th Ave., Palm City, FL (US) 34990

( * ) Notice: Subject to any disclaimer, the term of this patent is extended or adjusted under 35 U.S.C. 154(b) by 0 days.

(21) Appl. No.: 10/104,122

(22) Filed: Mar. 20, 2002

(51) Int. Cl.[7] ................................................. A01K 1/10
(52) U.S. Cl. .................................................. 119/51.03
(58) Field of Search ........................... 119/51.03, 51.01, 119/52.1, 52.2, 52.3, 52.4, 54, 57.8, 57.9, 428–431; D30/121, 124–128; 47/65, 65.5, 67

(56) References Cited

U.S. PATENT DOCUMENTS

| | | | | |
|---|---|---|---|---|
| 2,770,220 A | * | 11/1956 | Hyde | 119/60 |
| 3,182,635 A | * | 5/1965 | Waite | 119/428 |
| 3,399,650 A | * | 9/1968 | Goodman | 119/51.03 |
| 3,916,836 A | * | 11/1975 | Justl | 119/428 |
| 5,052,342 A | | 10/1991 | Schneider | |
| 5,377,617 A | * | 1/1995 | Harwich | 119/57.8 |
| D376,446 S | * | 12/1996 | Kerr | D30/124 |
| D398,722 S | * | 9/1998 | Hardison | 119/60 |
| 5,806,458 A | | 9/1998 | Harwich | |
| 5,826,541 A | * | 10/1998 | Wilkins | 119/57.8 |
| 6,024,047 A | | 2/2000 | Hoogland | |
| D448,126 S | * | 9/2001 | Colwell | D30/124 |
| D452,049 S | * | 12/2001 | Stokes et al. | D30/124 |

* cited by examiner

Primary Examiner—Thomas Price
(74) Attorney, Agent, or Firm—McHale & Slavin, P.A.

(57) ABSTRACT

A bell bird feeder has a self supporting wire framework with vertical members and horizontal members bounding openings through which small animals may gain access to the interior of the framework. The framework has a bottom that supports a compressed feed cake. The framework is hinged together to permit easy replenishing of the feed cake. A resilient closure is provided to hold the hinged sections together.

6 Claims, 2 Drawing Sheets

BIRD BELL FEEDER

FIELD OF THE INVENTION

The invention relates to a feeding device for small animals, especially birds. More particularly, the invention provides an enclosure for compressed food cakes and a support for resting birds.

BACKGROUND OF THE INVENTION

Many people enjoy the color and sounds occasioned by the presence of birds and small animals. To this end, people want to attract these animals to come within viewing and listening distances for a pleasurable experience. This is done by offering food, water and shelter. Also, in times of inclement weather, it may be necessary to protect such animals from the elements.

Usually, a small amount of water, such as a bird bath, and a food source is sufficient to attract these animals. Strategically placing these devices in the yard or close by the home will permit comfortable viewing of these animals in a natural environment.

A whole industry has developed for the care and feeding of animals, domesticated as well as wild, which offers a myriad of devices for such purposes.

DESCRIPTION OF THE PRIOR ART

U.S. Pat. No. 6,024,047 to Hoogland discloses a rectilinear wire cage for providing bird food while excluding ground animals such as squirrels. Harwich, U.S. Pat. No. 5,806,458 discloses a feeder having a wire face and a apertured face enclosing a compressed food cake. The two f aces are hinged together for access to the interior. The edges of the feeder are raised to prevent squirrels and raccoons from feeding on the cake. A feed cake closely conforming to a wire cage is disclosed by Schneider, U.S. Pat. No. 5,052,342. The entire device is inserted into a larger perch and support for use.

BestNest.com advertises a MILLENNIUM GLOBE SEED FEEDER in the shape of a globe with a column of feed supported inside the wire globe. The column has feeding ports for smaller animals while the wire globe prevents larger animals from reaching the food. PETsMART.com advertises a SEED BELL FEEDER from Birdola which encloses a feed b ell shaped cake inside a larger wire protector.

What is needed in the art is a feeder which generally conforms to the shape of the feed cake and is easy to manipulate for replacement of the cake.

SUMMARY OF THE INVENTION

Disclosed is a bell bird feeder having a self supporting wire framework. Bounded openings allow small animals to gain access to the interior of the framework. The framework has a bottom that supports a compressed feed cake. The framework is hinged together to permit easy replenishing of the feed cake. A resilient closure is provided to hold the hinged sections together.

Accordingly, it is an objective of the instant invention to teach a bird feeder for supporting, enclosing and protecting a compressed cake of bird seed.

It is a further objective of the instant invention to teach a bird feeder with a multiplicity of perches and openings to accommodate several birds at different positions.

It is yet another objective of the instant invention to teach a bird feeder which is constructed to permit access to the interior for replacing seed cakes.

It is a still further objective of the invention teach a closure and hanging support for the bird feeder.

Other objectives and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION OF THE INVENTION

Figure 1:
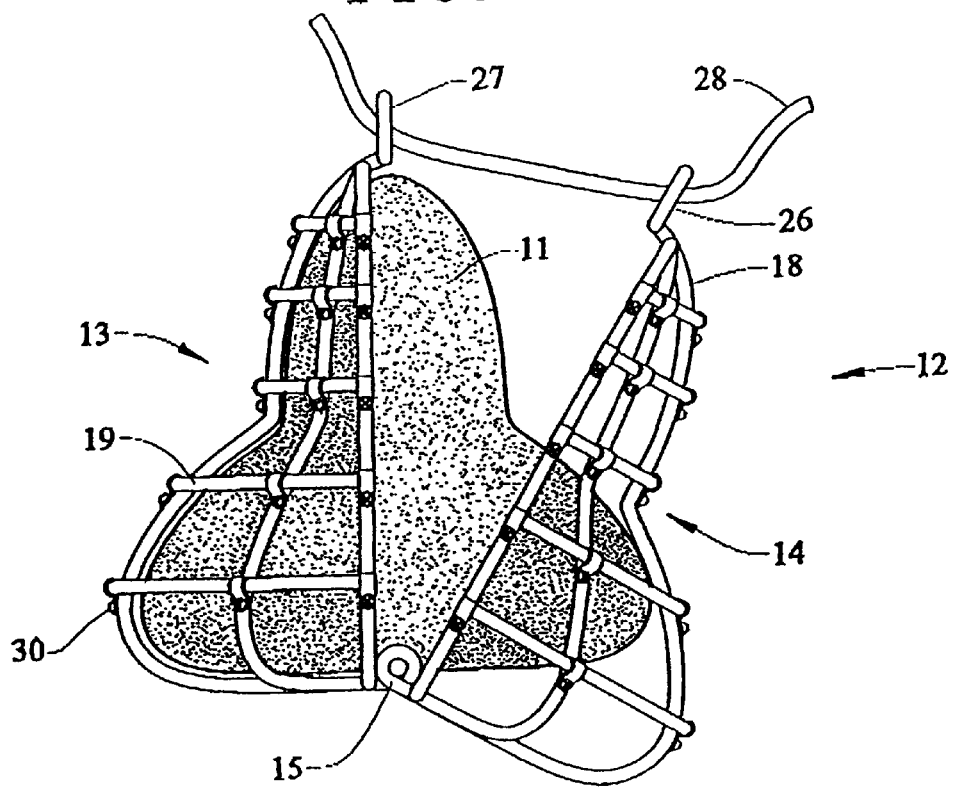
FIG. 1 shows a perspective of an open bird feeder with a compressed feed cake in the interior.

The compressed cake bird feed 11 is a commercially available item. The bell bird feeder 12 is an open wire framework with a periphery that generally follows the shape of the feed cake and resembles the shape of a bell. Of course, other feed cakes may be used with different shapes. The bird feeder is in the form of two symmetrical halves 13 and 14 which are hinged together for opening and closing the feeder. The hinge 15 is formed of the adjoining horizontal frame members having looped ends 16 surrounding a pin 17.

Figure 2:
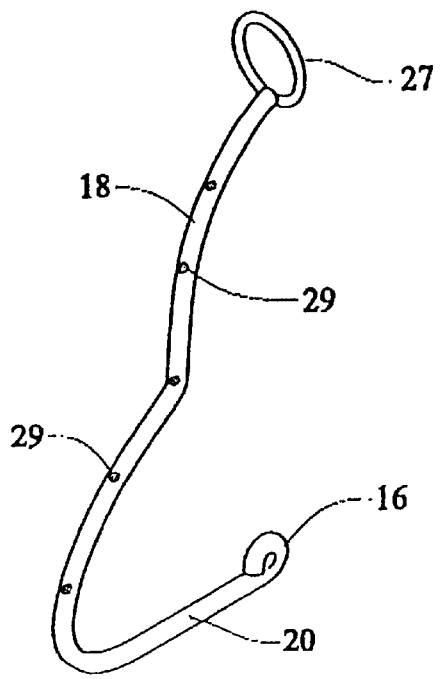
FIG. 2 is a side view of a vertical frame member.

The bird feeder 12 has vertical wire frame members 18 connected to horizontal wire frame members 19. In the illustration of FIG. 1, the bell bird feeder has ten vertical members however, the number may vary with the size of the feeder or the frame members. The vertical frame members 18 composing one symmetrical half of the feeder, as shown in FIG. 2, are each in the shape of the surface of a bell. The bottom of the bell has horizontal radial portions 20 which support the feed cake 11. The horizontal radial portions are joined at their ends to diametrical frame members 21 and 22 which define the congruent edges of the symmetrical halves.

Figure 3:
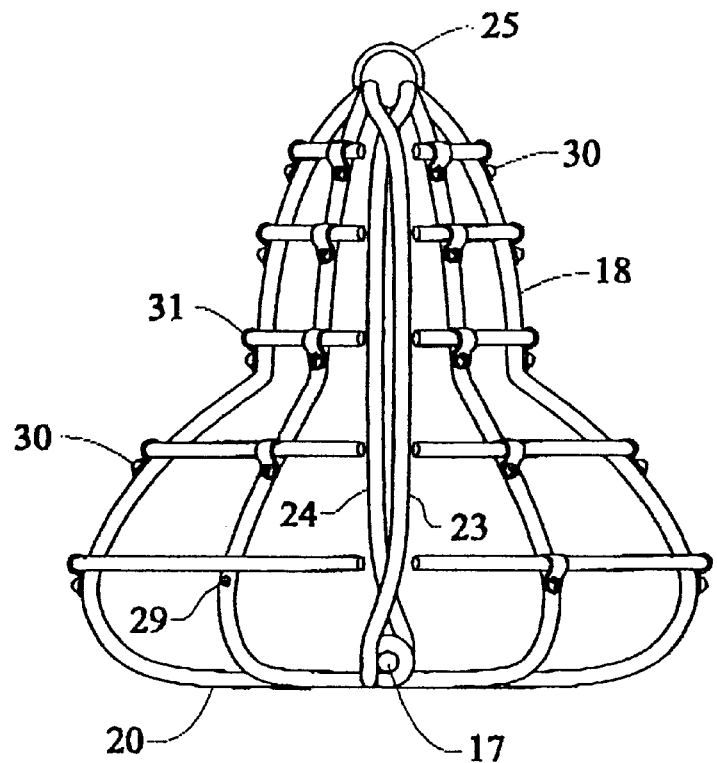
FIG. 3 is a perspective of the closed feeder; illustrating the frame closure.
Figure 4:
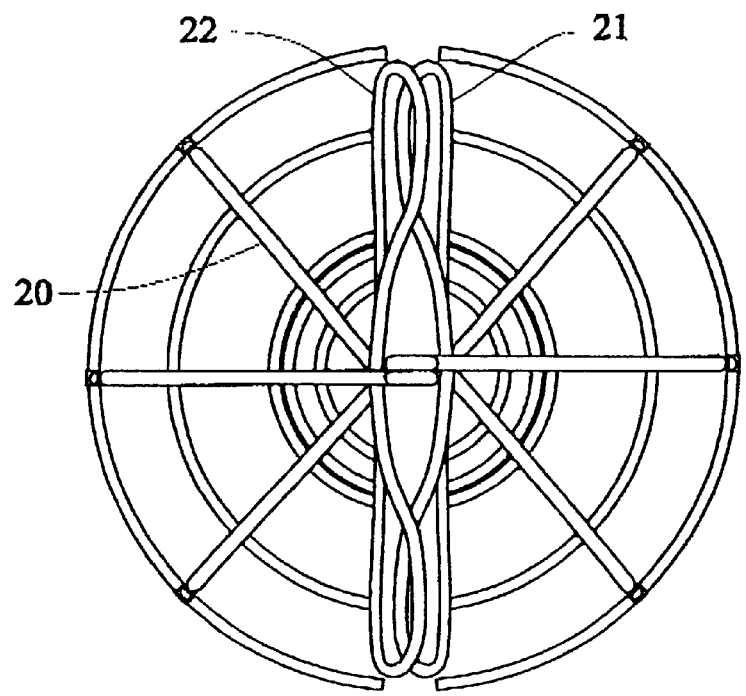
FIG. 4 is a perspective of the bottom of the bird feeder.

The diametrical frame members 21 and 22 form cooperating channels of the hinge 15 through which the pin 17 is inserted thereby allowing the symmetrical halves to pivot away from each other. Also, the vertical portions of the diametrical frame members 21 and 22 each have a bowed overlapping portion 23 and 24. These bowed portions resiliently engage each other, as shown in FIG. 3, forming a releasable closure for the symmetrical halves. A ring 25 is located at the apex of the bell shaped framework, the diametrical members 21 and 22 have ring segments 26 and 27 for suspending the closed bell bird feeder from a larger support. The ring segments 26 and 27, along with suspension cord 28, also form part of the bell closure with the weight of the feeder forcing the segments together. The ring may be a solid structure attached to only one diametrical member and the suspension cord may be chain, wire, or rod.

The vertical frame members 18 have a series of apertures 29 formed along their length which receive small screws 30. The screws 30 carry clips 31 to capture and secure in place the horizontal frame members 19. In some instances, the clips may be omitted and the horizontal members held by the heads of the screws 30. Other embodiments, could include small loops attached to the vertical members by welding, solder, adhesives, or like devices, and the horizontal members may be threaded therethrough.

The horizontal wire frame members 19 are formed, basically, as semi-circles. At each end of the horizontal frame member, a loop is formed to secure the member to the diametrical member. Rather than a loop, the connection may be other conventional fastenings, as mentioned above.

The openings in the bell bird feeder, bounded by the vertical members and the horizontal members, are of such a size to allow birds, perched on the wire framework, to insert their heads into the feeder to eat the feed cake. At the same time, the apertures limit the size of the animals able to gain entry.

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

What is claimed is:

1. An animal feeder for birds comprising a cage having a circular base and an apex adapted to contain a compressed cake of food, said cage having a self supporting wire frame defining openings through which birds may feed, said frame having first and second symmetrical sections, said first and second sections connected by a common hinge in said base, said first and second sections having vertical members and horizontal members, said first and second sections each having a releasable closure for securing said first and second sections together, said wire of said wire frame has a diameter sufficient to provide a gripping surface for birds and said closure includes suspension means for supporting said animal feeder and said vertical members in said first and second symmetrical sections each have a semicircular base for supporting said cake of food, each of said first and second symmetrical sections comprising a plurality of radial portions of said wire and at least one diametrical wire portion, said hinge formed between said semicircular base of said first and second sections, said hinge pivotally interconnecting said diametrical portions of said first and second symmetrical sections of said frame to form a circular base.

2. An animal feeder of claim 1 wherein said radial portions of said vertical members of said first and second symmetrical sections have a vertical portion extending from said semicircular base and connect said semicircular base to said closure.

3. An animal feeder of claim 2 wherein at least one of said vertical members of said first diametrical portion of one symmetrical half engages said vertical member of said diametrical portion of said second symmetrical half.

4. An animal feeder of claim 2 wherein the diameter of said frame varies between the large diameter of said circular base and the smaller diameter of said cage at said closure.

5. An animal feeder of claim 2 wherein said frame includes a plurality of substantially circular horizontal wire members with varying diameters engaging said vertical members between said circular base and said closure, said plurality of substantially circular horizontal members being substantially parallel with said circular base.

6. An animal feeder of claim 3 wherein said vertical members are provided with fasteners, said fasteners attached to said plurality of substantially circular horizontal wire members securing said plurality of substantially circular horizontal wire portions.

* * * * *